United States Patent
Uzzell, Jr.

[11] 3,883,750
[45] May 13, 1975

[54] METHOD AND APPARATUS FOR GENERATING POWER FROM WIND CURRENTS

[75] Inventor: Rudyard S. Uzzell, Jr., Bryn Mawr, Pa.

[73] Assignee: Natural Energy Systems, Inc., Philadelphia, Pa.

[22] Filed: Jan. 30, 1974

[21] Appl. No.: 437,948

[52] U.S. Cl. .................................. 290/55; 290/44
[51] Int. Cl. ............................................. F03d 9/00
[58] Field of Search ........ 290/54, 55, 43, 44; 416/6, 416/9, 10

[56] References Cited
UNITED STATES PATENTS

| | | |
|---|---|---|
| 984,599 | 2/1911 | Pichault .............................. 290/55 |
| 1,312,021 | 8/1919 | Dicksonson et al. ................. 290/55 |
| 1,345,022 | 6/1920 | Oliver ................................. 290/55 |
| 2,517,135 | 8/1950 | Rudisill ............................... 290/44 |
| 2,563,279 | 8/1951 | Rushing .............................. 290/55 |
| 3,339,078 | 8/1967 | Crompton ........................... 290/54 |

Primary Examiner—G. R. Simmons
Attorney, Agent, or Firm—Arthur A. Jacobs, Esq.

[57] ABSTRACT

A wind-powered energy producing device comprising a Venturi-shaped chamber mounted for rotation on a support, a rudder adapted to be acted upon by the wind to orient the openings of the chamber into the wind, and a fan positioned within the throat of the chamber to be acted upon by the wind entering the chamber, the fan being operatively connected to an energy producing device such as a generator or the like.

8 Claims, 6 Drawing Figures

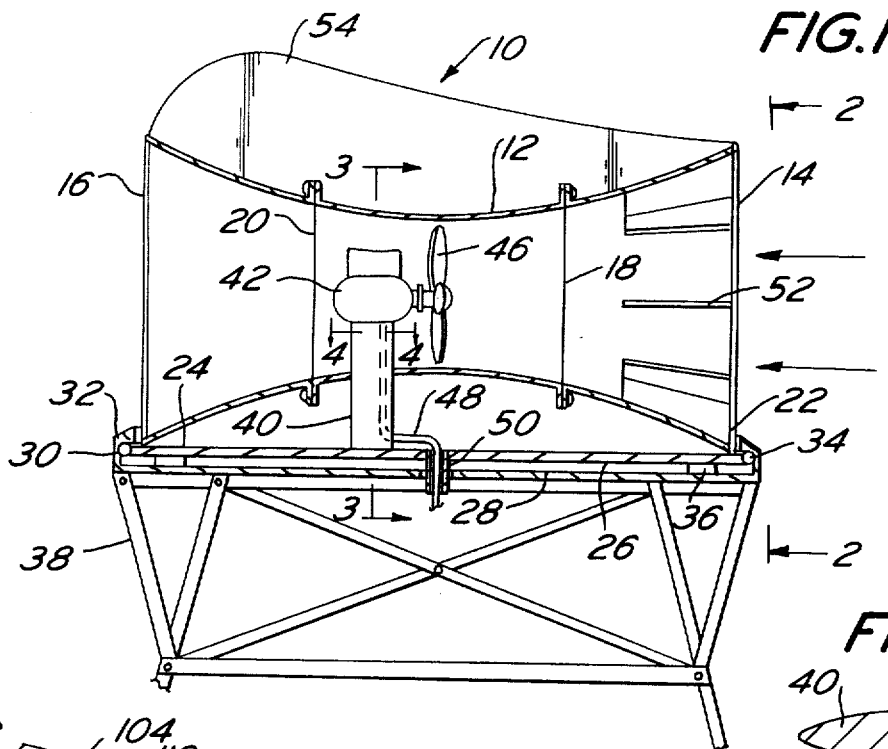
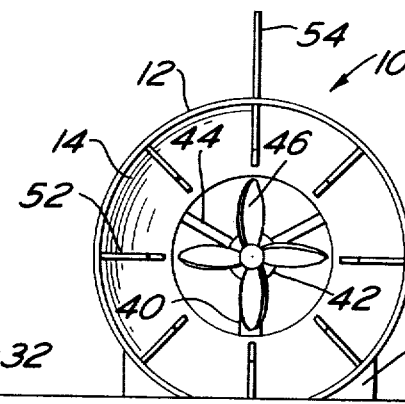
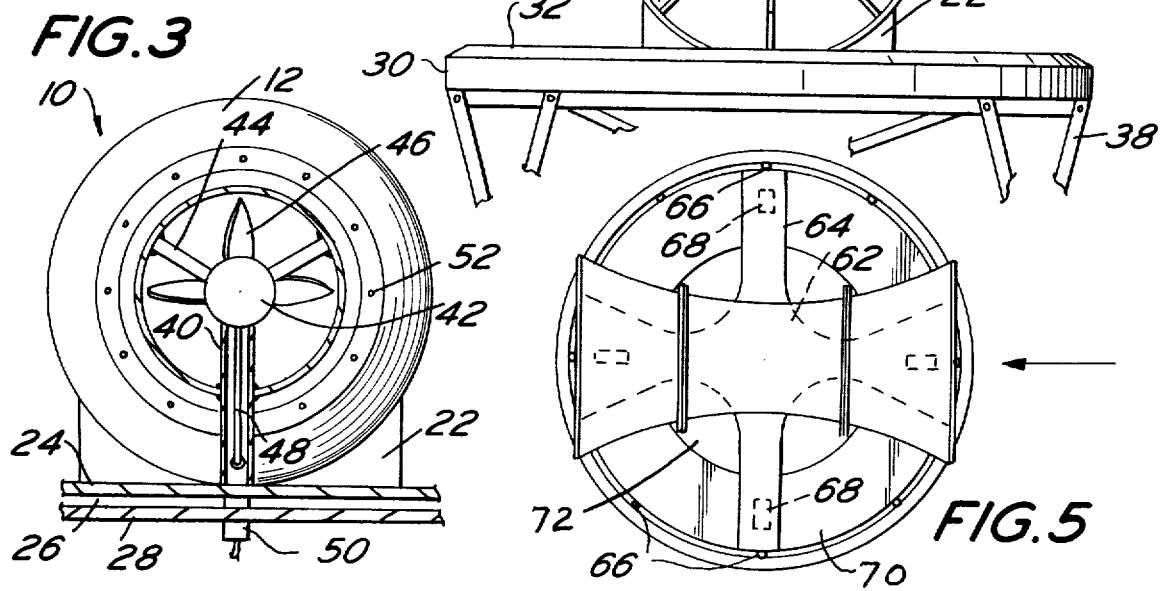

METHOD AND APPARATUS FOR GENERATING POWER FROM WIND CURRENTS

This invention relates to a device for generating electrical or mechanical energy, and it particularly relates to a device of the aforesaid type which generates electrical or mechanical energy by the utilization of wind power.

The use of wind power, such as windmills or the like, to generate electrical or mechanical energy has, of course, long been known. However, such use of windmills has been largely restricted by the fact that the amount of energy derived from these windmills was relatively low in comparison with the size, bulk and weight of the windmills. This has made such windmills economically infeasible.

It is an object of the present invention to provide a wind-powered energy producing device which is relatively small in structure compared to the ordinary windmill but which significantly increases the amount of energy derived from the wind source.

It is another object of the present invention to provide a wind-powered energy producing device of the aforesaid type which is simple in construction, relatively inexpensive to produce and maintain, and which is highly efficient in its operation.

Other objects and many of the attendant advantages of this invention will be readily appreciated as the same becomes better understood by reference to the following description when read in conjunction with the accompanying drawings wherein:

FIG. 1 is a somewhat diagrammatic sectional view of an energy producing device embodying the present invention.

FIG. 2 is an end view of the device of FIG. 1, taken on line 2—2 of FIG. 1.

FIG. 3 is a sectional view taken on line 3—3 of FIG. 1.

FIG. 4 is a sectional view on line 4—4 of the supporting post.

FIG. 5 is a top plan view of a modification of the device of FIG. 1.

FIG. 6 is a somewhat diagramatic sectional view, similar to FIG. 1, of another modified form of the device of FIG. 1.

In accordance with the present invention, a wind-powered energy producing device is mounted in any desired location, either on the ground, on top of a building, on a tower, etc. Preferably, the device is mounted on a tower in order to obtain the desired height where the force of the wind is at its most desirable level and where there are no obstructions.

The energy producing device comprises a Venturi-shaped housing or chamber, that is open at opposite ends. Within the chamber is a fan which rotates on an axis extending longitudinally of the chamber and is operatively connected either to a generator for generating electrical energy or to a mechanical gear train or the like for providing mechanical energy.

The wind enters one end of the Venturi-shaped chamber and its velocity is accelerated by the Venturi passage, whereby, when it contacts the fan, the fan is rotated at increased velocity relative to the velocity of an unducted fan of the same dimensions in the same wind.

A guide vane of aerodynamic design is provided on the device whereby when the wind shifts, it acts against the vane to rotate the Venturi chamber into the correct position to orient the open end of the chamber into the wind.

Although not absolutely necessary, it is preferable to provide guide vanes within the upstream portion of the Venturi chamber to minimize turbulence as the air stream strikes the fan.

Referring now in greater detail to the various figures of the drawings wherein similar reference characters refer to similar parts, there is shown in FIG. 1 an energy device, generally designated 10, comprising a chamber 12 having an upstream or front opening 14 and a downstream or rear opening 16. Between the two end openings, the chamber is provided with a Venturi-shaped configuration. As shown, the chamber 12 is constructed of three sections riveted or otherwise secured together at the seams shown at 18 and 20. This construction is preferable from a practical assembly viewpoint; however, the chamber may be made either as an integral unit or from a varible number of sections within the scope of the invention.

The chamber 12 is mounted on a gusset plate 22 constructed of any feasible material such as heavy aluminum, steel, or the like. This gusset plate is itself supported on a rotatable plate or turntable 24 positioned within a guide channel 26. The guide channel 26 is defined by a platform 28 having an upstanding peripheral wall 30 provided with an inwardly-extending upper peripheral flange 32.

The turntable 24 is rotatably supported within the guide channel 26 by ball bearings 34 at the peripheral edge thereof and by cylindrical roller bearings or small wheels 36 at the bottom thereof.

The platform 28 is shown as fixed to the top of a tower, the upper portion of which is shown at 38. However, as indicated above, any other desirable and feasible support means may be substituted within the scope of the invention.

Mounted on the turntable 24, eccentric to the axis thereof and closer to the downstream end of the chamber 12, is an air foil shaped post 40. The post 40 extends into the chamber 12 and supports an electrical generator 42, at its upper end. A plurality of struts 44, here shown as three in number and spaced 120° apart, act to brace the generator in place. Operatively connected to the generator shaft is an airscrew or fan 46, the fan being situated at the narrowest portion or throat of the Venturi chamber 12. Electrical lead wires 48 extend from the generator 42 through the post 40 and then through a sleeve 50, positioned between corresponding apertures in turntable 24 and platform 28, to an energy receiving means (not shown).

Extending radially inward from the opening 14 are a plurality of annularly-spaced ribs or vanes 52. These vanes 52 have an aligning effect on the incoming wind, directing the wind in the proper longitudinal direction against the fan 46, and substantially reducing turbulence as the air stream strikes the fan. Although these vanes 52 are preferably provided, it is, nevertheless, still feasible to satisfactorily operate the device without them, although not as effectively.

The vanes 52 are shown as constructed integrally with the wall of the chamber. However, it is, sometimes, more practical to provide a separate sleeve provided with these vanes, and to removably position such sleeve within the chamber adjacent the opening 14. This not only reduces the complexity and, therefore, the cost of fabrication, but permits replacement of that portion of the chamber which may be more easily eroded by direct action of the wind and particles contained therein. In addition, it permits the use of the device either with or without the vanes or with different numbers, shapes or sizes of vanes depending on varying wind conditions or on varying locations in which the device is used.

Mounted on top of the chamber 12 is a guide vane or rudder 54 of predetermined streamlined aerodynamic shape. This rudder 54 is constructed and arranged to be acted upon by the wind to rotate the turntable 24 in accordance with the varying direction of the wind to effect constant orientation of the opening 14 into the wind. The rudder 54 also acts as a gusset plate or rib to add strength to the chamber 12. In addition, the construction of the rudder, whereby the wider portion is at the downstream end, permits it to act in conjunction with the eccentrically mounted post 40 and generator 42 to serve as a counterbalance to effect stabilization of the entire structure when subjected to the force of the wind.

The fan 46 is shown as having four blades but a two-bladed fan or a fan with any other number of blades that is desirable and feasible may be substituted.

In FIG. 5 there is shown a modified form of the device of FIG. 1. In this device, generally designated 60, all the parts are essentially the same as in the device of FIG. 1 except that the turntable 62, corresponding to turntable 24, is of spider-like construction having a plurality of radial arms or spokes 64. The turntable 62 is similarly rotatably supported by bearings 66 and 68 similar to the bearings 34 and 36. The support platform 70 is provided with a central aperture 72. This spider-type construction of the turntable 62 and the apertured platform 70 is usually preferable because it permits passage of vertical wind currents, thereby diminishing vertical thrust forces therefrom. It also prevents accumulations or encrustations of water, ice and snow, while considerably lightening the total weight of the device.

In FIG. 6 there is shown a modified form of the device wherein the device, generally designated 100, is similar in construction to that shown in FIGS. 1–3, in that it is provided with a similar supporting tower, a supporting platform similar to platform 28, a peripheral wall similar to that shown at 30, a peripheral flange similar to that shown at 32, a channel similar to that shown at 26, and bearings similar to those shown at 34 and 36, these parts not being shown in the drawing.

A similar Venturi-shaped chamber is provided at 102 and a similar rudder is provided at 104. A fan 106 is mounted on a shaft 108 rotatably positioned in a bearing 110 positioned on a bracket 114. A strut 116 acts to support the bracket 114.

A sprocket 118 is mounted on the shaft 108 and is adapted to drive a sprocket 120 mounted on a shaft 122, rotatably supported at the lower portion of bracket 114, by means of a drive chain 124. A pulley 126 is mounted on shaft 122, and this pulley is adapted to be connected by a drive belt (not shown) to another pulley (not shown) for driving any desired mechanical device.

Instead of the chain and sprocket system shown, the shaft 108 may be provided with a gear forming part of a gear train or forming part of any other type of mechanical transmission system. Furthermore, instead of a mechanical system, the pulley 126 may be replaced by an electrical generator of the same type as shown at 42.

Although its use is optional, it is preferred to coat the interior of the Venturi chamber with a water-repellant, and, if desired, a heat and cold resistant coating such as "Teflon" or the like.

The Invention claimed is:

1. A wind-driven energy-generating device comprising a Venturi-shaped chamber having a central throat portion and enlarged end portions at opposite sides of said throat portion, one end portion being an upstream end portion and the other a downstream end portion, both of said end portions being open, said chamber being mounted for rotation on an axis provided by a first support means, a second support means extending into said throat portion, said second support means being positioned downstream from said first support means whereby said second support means is eccentric to said first support means, an energy generating means mounted on said second support means, a fan connected to said energy-generating means, said fan being mounted for rotation on said second support means within said throat portion, said throat portion being free of fixed blade construction, said fan being radially spaced from the wall area defining said throat portion, said second support means, energy generating means and fan having a center of gravity offset from said axis provided by said first support means and a wind-operable orienting rudder, said rudder extending longitudinally of said chamber and being positioned radially outward of said chamber.

2. The device of claim 1 wherein said energy-generating means is an electrical generator.

3. The device of claim 1 wherein said energy-generating means is connected to a mechanical transmission system for generating mechanical energy.

4. The device of claim 1 wherein at least one vane is provided on the inner peripheral surface of the chamber adjacent said front opening, said vane extending radially inward of said chamber.

5. The device of claim 4 wherein there are a plurality of vanes radially spaced equidistantly from each other.

6. The device of claim 1 wherein said first support means is a rotatable turntable, the axis of rotation of said turntable being the axis of rotation of said chamber.

7. The device of claim 1 wherein said rudder has a narrow portion and a wide portion, said narrow portion being adjacent to but radially spaced from the open end of said upstream end portion and said wide portion being adjacent to but radially spaced from the open end of said downstream end portion.

8. The device of claim 1 wherein said rudder has a length corresponding to the length of said chamber and is provided with a longitudinal streamlined configuration.

* * * * *